June 27, 1939.   H. C. BEREIT   2,164,104
FLUX CARRYING TAPE AND METHOD OF ASSOCIATING SAME WITH A WELDING WIRE
Filed March 29, 1939   2 Sheets-Sheet 1
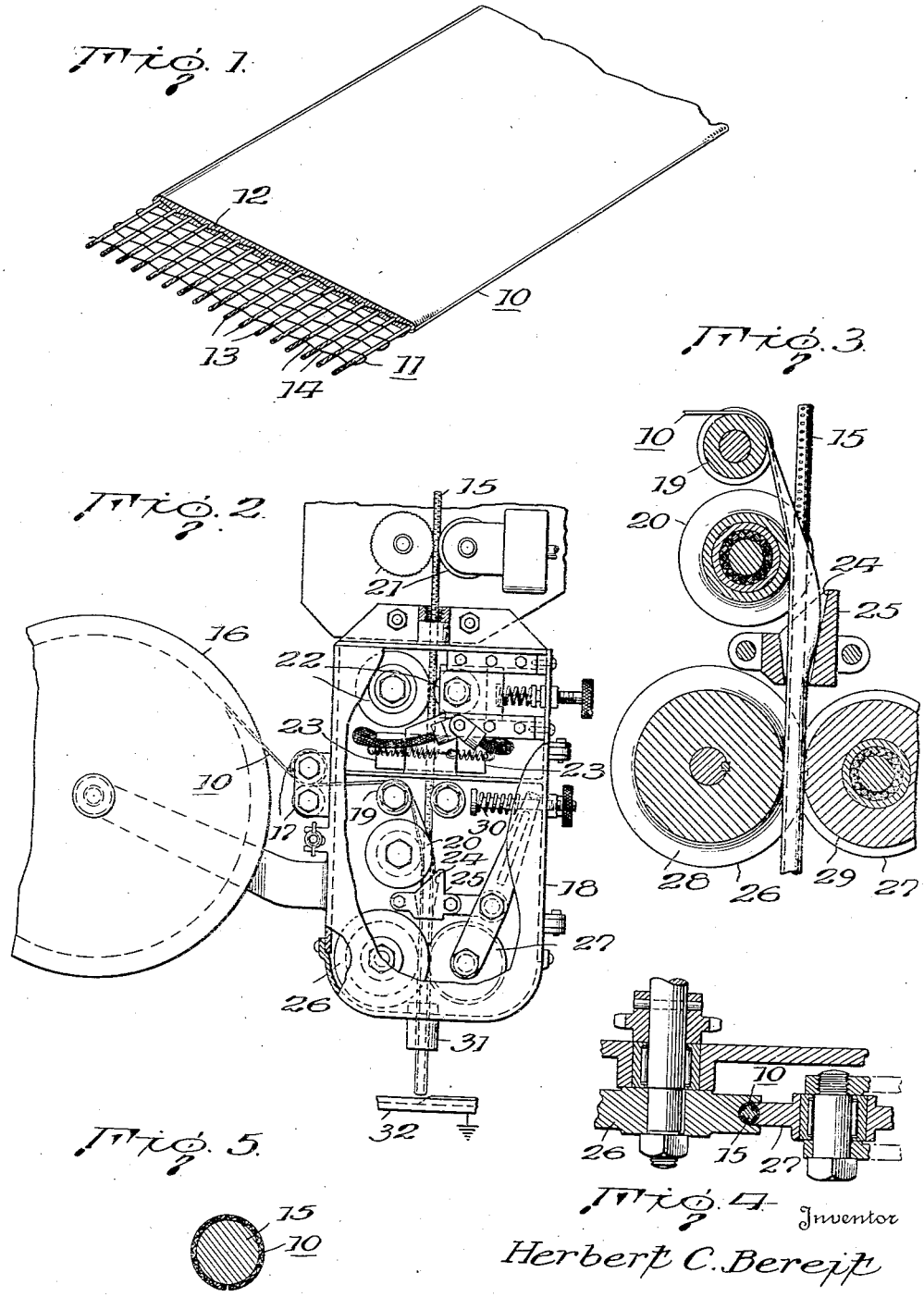
Inventor
Herbert C. Bereit
By Donald B. Waite
Attorney June 27, 1939.  H. C. BEREIT  2,164,104
FLUX CARRYING TAPE AND METHOD OF ASSOCIATING SAME WITH A WELDING WIRE
Filed March 29, 1939  2 Sheets-Sheet 2
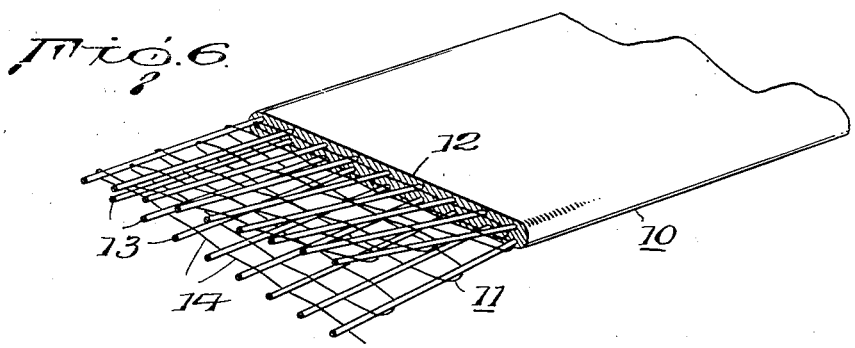
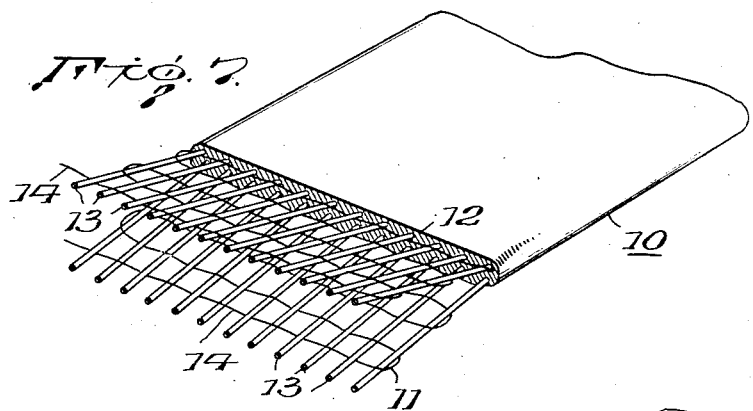
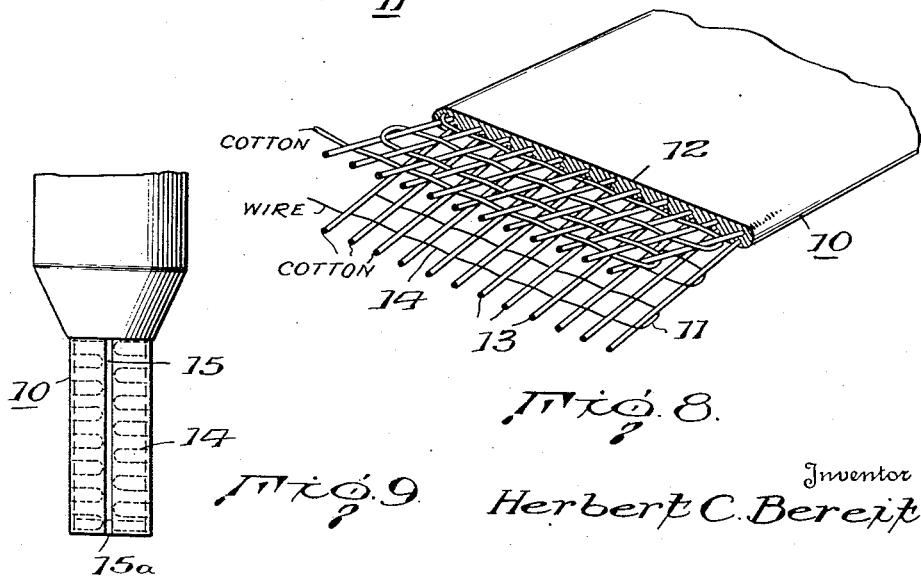
Inventor
Herbert C. Bereit,
By Donald B. Waite
Attorney Patented June 27, 1939

2,164,104

UNITED STATES PATENT OFFICE 2,164,104

FLUX CARRYING TAPE AND METHOD OF ASSOCIATING SAME WITH A WELDING WIRE

Herbert C. Bereit, Cleveland, Ohio, assignor to Una Welding, Inc., Cuyahoga County, Ohio, a corporation of Ohio Application March 29, 1939, Serial No. 264,831

14 Claims. (Cl. 219—8)

This invention relates to automatic arc welding, more particularly to flux carrying tapes which carry fluxing, slag producing or other material desirable in a welding operation and to a method of associating a flux carrying tape with a welding wire during the welding operation, which said tapes and method are disclosed in my copending application, Serial No. 221,224, filed July 25, 1938, and the present application, accordingly, is a continuation-in-part thereof.

In automatic arc welding in which the welding electrode or wire is continuously fed to the work, it is frequently desirable to employ the shielded arc principle of welding. In one process, the practice is to continuously feed a tape, having fluxing, slag producing or other desirable characteristics, with the welding wire, and to simultaneously form the same about the wire.

Heretofore, it has been the practice to employ a tape formed entirely of loosely woven cotton, asbestos yarn or the like impregnated or coated with the fluxing or slag producing or other desired mixture. Considerable difficulty is experienced in maintaining tapes of this character about the welding wire as the wire and tape leave the welding head in that they tend to assume their normal flat shape and flare away from the welding wire with the result that the desired character of weld is frequently not obtained. When the welding machine is shut down, considerable heat prevails for a short period of time after shut down and, due to this heat, the fibres of such tapes char or burn back from the end of the wire, thereby releasing the fluxing or slag producing material so that in starting the welding machine again it is necessary to first cut off a portion of the welding wire to compensate for the loss of the fluxing material. This results in waste of material and loss of time, and also it is necessary to operate the machine for a short period before the cup desired for shielding the arc is again obtained. Furthermore, a tape formed entirely of cotton fibres may have a tendency to shrink in width. When this occurs, the desired circumferential extent of the tape about the welding wire cannot be attained.

Accordingly, one of the main objects of the present invention is to provide a welding electrode or wire with a fluxing or slag producing tape of new and improved formation, principally, a tape which will maintain its folded or formed position about the welding wire, which will not burn back or char and will hold the material about the welding wire, and which will not tend to shrink in width.

Another object is to provide a fluxing or slag producing tape of strength and durability that is greater than in tapes previously known in the welding art.

Another object is to provide a welding tape in which at least a portion of the material carrying element may have alloying or deoxidizing characteristics or both.

A further object is to provide a fluxing or slag producing tape of improved flux holding characteristics, and one which can be economically manufactured.

A further object of the present invention is to provide a new and improved method of associating a flux carrying tape with a welding wire, by means of which the tape is formed about the welding wire into intimate contact therewith and in such manner that the tape maintains its conformed shape.

In the drawings which illustrate suitable embodiments of the invention and one form of apparatus that may be employed in practicing my invention:

Figure 1 is an enlarged fragmentary perspective view of the tape, a portion of the fluxing material being removed to show the flux carrying portion thereof;

Figure 2 is a fragmentary side elevation of one form of apparatus that may be employed;

Figure 3 is an enlarged sectional view of portions of the forming and feeding apparatus shown in Figure 2, showing the flux carrying tape in the process of being associated with the welding wire;

Figure 4 is a section taken approximately on the line 4—4 of Figure 2;

Figure 5 is an enlarged section of the welding wire and tape in final associated position;

Figure 6 is a view similar to Figure 1 showing a modified construction in which the web strip is doubled upon itself;

Figure 7 is a view showing a modified construction in which two superimposed web strips are employed;

Figure 8 is a view similar to Figure 7, but in which the transversely extending elements in one of the strips are of non-metallic material; and Figure 9 is an enlarged fragmentary view showing the ends of the tape and welding wire projecting from the guide nozzle of the welding apparatus.

In my said copending application, I have described one form of flux carrying tape in which the fluxing or slag producing material may comprise any of the well known agents desired for performing certain desired functions during the welding operation and in which the flux carrying element of the tape is in the form of a strip having certain of its elements of inelastic, deformable material, which elements are capable of inherently maintaining any deformed position.

The strip preferably is woven of spaced intersecting elements in which the spacing is such as to provide openings of appreciable size for the reception of the fluxing or slag producing material therein. The fluxing or slag producing material may be applied to the strip in various manners, one satisfactory manner being to form the desired material into a fluid or semi-fluid body, then to pass the strip through this body to completely cover and coat the same, or to employ an extruding process, and, finally, to allow the coated strip to dry. In drying, the material on opposite sides of the strip becomes united through the openings in the strip whereby to provide for greater adhesion.

The web strip may be formed in different manners. However, it is preferred to weave transversely extending elements through longitudinally extending elements in such manner that each transversely extending element passes on opposite sides of adjacent longitudinal elements and each adjacent transversely extending element passes on the reverse sides of the longitudinal elements.

In order that the tape will retain a definite deformation when formed around the welding wire and closely hug the same, the transversely extending elements are formed of a suitable inelastic material which will easily deform and yet will not tend to return to their original shape. For this purpose I preferably employ soft annealed wire threads of small diameter, such as, for example, thirty-six (36) gauge. Other gauges of wire may, of course, be used.

If desired, the wire threads may have alloying or deoxidizing characteristics, or both, and, depending upon the nature of the material that is to be welded, they may be copper, iron, stainless steel, monel metal, or of alloy material, or other suitable material having the desired inelastic, yet deformable, characteristics.

It is desirable that the longitudinally extending threads or elements be of a flexible nature so as to permit easy rolling and unrolling so that the same may be carried on suitable spools. In this connection they may be of a cellulosic material, such as cotton. However, these threads may be composed of asbestos fibre, finely spun glass or other suitable material.

When an automatic welding machine as previously stated is first shut down, considerable heat is thrown off for a short time from the welding wire, with the result that in the previously used tapes the cotton threads char and disintegrate, allowing the fluxing or slag producing material to drop away from that portion of the welding wire which protrudes from the welding head. The soft wire threads, described, will withstand the retained heat and will not char, and the fluxing and slag producing material will, therefore, be retained around the welding wire. In the preferred form of my invention, instead of the transversely extending elements being individual elements, they are formed of a continuous thread extending back and forth through the longitudinal threads, in parallel relation or, if desired, in a sinuous formation. By doing this, the transversely extending elements since they are continuously connected, will insure the holding of the fluxing or slag producing material about the welding wire, even though the longitudinally extending threads may have disintegrated because of the heat thrown off from the welding wire, as described.

I have shown in Figure 1, for illustration, one form of the tape 10 as comprising a woven strip 11 having a coating 12 of desired fluxing material. In this strip 11 there are spaced longitudinally thread elements 13 of cotton or other suitable material and cross elements 14 of inelastic, deformable material preferably in the form of a continuous thread of fine, soft, annealed wire woven back and forth throughout the length of the strip 11. However, it is to be understood that the elements 13 and 14 may have other suitable arrangements providing, of course, that the inelastic, deformable elements 14 are arranged in such manner that they will perform their function of maintaining the tape in formed position about the welding wire 15.

By referring to Figure 9, the welding electrode or wire with the tape wrapped therearound is shown projecting from the guide nozzle 31 as upon shut down of the welding operation. The position of the continuous thread 14 will be noted. The thread 14 holds the fluxing material closely about the wire 15 even though the longitudinal threads may have become charred. It will also be noted that the pocket 15a desired in shielded arc welding remains ready for the start of the next welding operation.

Preferably, the web strip 11 is of a single thickness. However, in certain classes of work it is desired to employ an extra weight of fluxing or slag producing material. In this connection, the web strip may be of double width so that it may be folded upon itself along its longitudinal axis, as shown in Figure 6, or two or more tapes of normal width may be superimposed upon each other, as shown in Figure 7. Also, a double thickness of tape may be provided by using one thickness of the tape described and a second thickness of all-cotton or similar tape, as shown in Figure 8.

The tape of the present invention is especially adapted for feeding longitudinally with the welding wire in continuous arc welding machines and when folded around the wire, it will retain its folded shape.

In practicing the present invention, briefly, the welding wire is fed to the work to be welded and simultaneously therewith the tape is fed with the wire and during the feeding operation the tape is caused to be shaped about the welding wire and simultaneously substantially permanently deform to such a degree of permanency as to maintain the tape in formed position about the welding wire, whereby the welding wire as it is fed into the welding arc will be intimately confined within the flux carrying tape.

In the drawings, I have shown one form of apparatus that may be used in practicing the invention. In this apparatus the tape 10 is carried on a suitable reel 16 and feeds between a pair of smoothing rolls 17 into a casing 18 and thence over a cylindrical roller 19 into contact with the grooved surface of a roller 20 carried by the casing 18. The welding wire 15 is fed into the casing 18 by means of a mechanism including driven rollers 21 which frictionally engage the wire, and passes between straightening rollers 22. The wire 15 then engages current carrying brushes 23 and bears against the tape 10 at the roller 20 with sufficient pressure to grip the tape, whereby the tape 10 will be moved while the wire 15 by means of this gripping engagement. Also, by reason of this, the tape 10 is caused to assume an arcuate shape.

The tape 10 and wire 15 then pass through a conical passage 24 in a member 25, wherein the edges of the tape are brought about the wire 15 and toward each other. The tape 10 and wire 15 then pass between rollers 26 and 27. The roller 26 is formed with a deep groove 28 and the roller 27 is formed with a shallow groove 29 and is narrower than the roller 26. The roller 27 is a pressure roller and is urged toward the roller 26 and into the groove 28 by means of a compression spring 30 so as to completely confine the tape 10 within the continuous surfaces provided by the grooves 28 and 29. By reason of the pressure exerted by the roller 27, the tape 10 is substantially tensioned and deformed into intimate substantially completely surrounding engagement with the welding wire 15.

After leaving the rollers 26 and 27, the wire and tape pass through a guide element 31 which guides the same to the work 32, the welding arc being struck between the wire 15 and the work 32. The tape 10 by reason of the substantially permanent deforming thereof will be maintained in its intimate contact with welding wire 15 at the arc during the welding operation. This is a distinct advantage in that the fluxing material will be properly fed with the welding wire into the welding arc for performing the desired functions.

While I have shown one form of feeding and tape deforming apparatus it is to be understood that other types of apparatus may be used in practicing the present invention.

In addition to the advantages that the tape of my invention, when formed around the welding wire, will continue to hold its deformation and not tend to assume its normal flat shape, and that the tendency towards burning back is minimized, there are certain other advantages which are of material value in automatic arc welding. One of these advantages is that the coated tape described is of greater strength and durability and consequently will withstand harder usage in handling than tapes heretofore known and employed, and will better hold the fluxing or slag producing material.

A further useful advantage is that transverse shrinkage of the tape is prevented by the transversely extending elements described. Since there is no transverse shrinkage, the tape will always be uniform in width, and insurance will be had that the tape will extend around the welding wire the desired circumferential extent.

It is obvious that the advantages of the tape described are extremely useful in automatic arc welding, especially in arc welding in which the shielded arc principle is employed.

While I have described certain materials for the strip to which the fluxing or slag producing material is applied, it is to be understood that there are other equivalent materials having similar characteristics which will fulfill the purpose of the materials described.

In some of the claims I have used the term substantially permanently deformable in the sense that the cross elements of the web strip will not have an inherent tendency to spring back or return to their original shape but will tend to remain in any shape to which the tape is formed. Also I have used the term "fluxing or slag producing material" in the specification and claims, and it is to be understood that these terms comprehend any material which may be desired to be carried by the tape, including the cross elements which may include deoxidizing and alloying material, for use in the welding operation.

It is to be understood that I intend no limitations upon the invention other than those imposed by the scope of the appended claims.

What I claim is:

1. The method of associating a flux carrying tape with a welding wire during the process of feeding such wire to a weld, which comprises feeding the tape with the wire and simultaneously wrapping the tape about the wire and substantially permanently deforming portions of the tape to such a degree of permanency of deformation as to retain the tape in its wrapped position.

2. The method of associating a flux carrying tape with a welding wire during the process of feeding such wire to a weld, which comprises feeding the tape into engagement along its longitudinal center line with the welding wire and simultaneously moving and substantially permanently deforming the side portions of said tape into intimate surrounding engagement with said wire with such degree of permanency as to retain the tape in its surrounding relation with respect to the wire.

3. The method of metallic arc welding which consists in feeding a welding wire to a weld arc, substantially permanently deforming a flux carrying tape to substantially the external diameter of the welding wire and disposing said deformed tape about said wire and feeding said tape simultaneously with the wire to the arc.

4. A tape of the character adapted to be disposed about an arc welding wire comprising a web strip constituting a flux carrier and including a substantially permanently deformable element which renders the tape self retaining of its shape when disposed about the welding wire, and flux material carried by said tape.

5. A tape of the character adapted to be formed about an arc welding wire, comprising a perforate strip having a coating of fluxing material thereon, said strip embodying longitudinally extending material and transversely extending material, said transversely extending material being pliable and inelastic and having the characteristic of closely maintaining its formed condition.

6. A tape of the character adapted to be formed about an arc welding wire, comprising a woven strip having longitudinally extending elements and transversely extending elements, said transversely extending elements being of substantially permanently deformable material having the characteristic of maintaining a predetermined formed position, and a coating of fluxing material carried by said strip.

7. A tape of the character adapted to be formed longitudinally about an arc welding wire comprising a web strip having a coating of fluxing material carried thereby, said strip being flexible whereby to permit rolling of the tape into a coil, and including spaced substantially permanently deformable elements having the characteristic of maintaining the tape in the shape to which it may be formed.

8. A tape of the character adapted to be formed about an arc welding wire, comprising a mesh strip of interwoven spaced, transversely and longitudinally extending elements, said transversely extending elements being pliable and inelastic and capable of inherently maintaining the tape in the shape to which it is formed, and a coating of fluxing material carried by said strip and being united through the spaces between said elements.

9. A tape of the character adapted to be bent about an arc welding wire comprising a strip of interwoven transversely extending and longitudinally extending elements having a coating of fluxing material thereon, said transversely extending elements comprising threads of soft pliable wire, said wire threads being substantially permanently deformable whereby to maintain said tape in bent position about the welding wire.

10. A tape of the character adapted to be bent about an arc welding wire comprising a strip of interwoven transversely extending, and longitudinally extending elements having a coating of fluxing material thereon, said transversely extending elements comprising a continuous thread of soft pliable wire extending back and forth through said longitudinally extending elements substantially throughout the length of said tape, said wire thread being substantially permanently deformable whereby to maintain said tape in the position to which it is formed, said continuous thread of wire serving to maintain the fluxing material in position at temperatures below the melting temperature of the wire thread.

11. A tape of the character adapted to be folded longitudinally about an arc welding wire, comprising a flat web having a plurality of longitudinally extending threads and a plurality of transversely extending threads, said transversely extending threads being of alloying substantially permanently deformable material and having the characteristic of maintaining the tape in the shape to which it may be folded.

12. A tape of the character adapted to be folded longitudinally about an arc welding wire, comprising a flat web having a plurality of longitudinally extending threads and a plurality of transversely extending threads, said transversely extending threads being of a deoxidizing substantially permanently deformable material and having the characteristic of maintaining the tape in the shape to which it may be folded.

13. A tape for use in arc welding and of the character adapted to be formed about an arc welding wire, comprising a flat strip and a body of fluxing material carried by said strip, said strip comprising a plurality of superimposed webs of longitudinally and transversely extending elements, the transversely extending elements of at least one of said webs being comprised of inelastic deformable wire.

14. A tape for use in arc welding and of the character adapted to be formed about an arc welding wire comprising a flat strip and a body of fluxing material carried by said strip, said strip comprising a plurality of superimposed webs, each having longitudinally and transversely extending elements, the transversely extending elements of one of said webs being comprised of substantially permanently deformable wire having the characteristic of maintaining the tape in formed position and the transversely extending elements of another of said webs being comprised of non-metallic material.

HERBERT C. BEREIT.